United States Patent [19]

Levitan

[11] Patent Number: 5,758,143
[45] Date of Patent: May 26, 1998

[54] METHOD FOR UPDATING A BRANCH HISTORY TABLE IN A PROCESSOR WHICH RESOLVES MULTIPLE BRANCHES IN A SINGLE CYCLE

[75] Inventor: David Stephen Levitan, Austin, Tex.

[73] Assignee: International Business Machines Corporation, Armonk, N.Y.

[21] Appl. No.: 726,963

[22] Filed: Oct. 7, 1996

[51] Int. Cl.$^6$ .................................................. G06F 9/38
[52] U.S. Cl. .................................................. 395/587
[58] Field of Search .................................................. 395/587

[56] References Cited

U.S. PATENT DOCUMENTS

| | | | |
|---|---|---|---|
| 5,265,213 | 11/1993 | Weiser et al. | 395/587 |
| 5,287,467 | 2/1994 | Blaner et al. | 395/587 |
| 5,333,283 | 7/1994 | Emma et al. | 395/587 |
| 5,367,703 | 11/1994 | Levitan | 395/587 |
| 5,414,822 | 5/1995 | Saito et al. | 395/587 |
| 5,553,253 | 9/1996 | Pan et al. | 395/587 |
| 5,634,119 | 5/1997 | Emma et al. | 395/587 |

*Primary Examiner*—William M. Treat
*Attorney, Agent, or Firm*—Jenkens & Gilchrist; Raymond M. Galasso; Anthony V. S. England

[57] ABSTRACT

A method and apparatus for updating a branch history table (BHT) in a processor which resolves multiple branches in a single cycle is disclosed. The method and apparatus utilizes a single write ported BHT that achieves similar performance to a two write ported BHT by selecting only data corresponding to one of the branch instructions for updating the BHT. The data corresponding to the branch instruction for updating the BHT is selected based upon whether a prediction of the instruction path set by the branch instruction was correctly predicted and the state of a corresponding saturation up-down counter in the BHT.

16 Claims, 5 Drawing Sheets

METHOD FOR UPDATING A BRANCH HISTORY TABLE IN A PROCESSOR WHICH RESOLVES MULTIPLE BRANCHES IN A SINGLE CYCLE

BACKGROUND OF THE INVENTION

1. Field of the Invention

The present invention relates, in general, to information handling systems and, more particularly, to methods for updating branch history tables within an information handling system.

2. Background of the Invention

The presence of branch instructions in the instruction stream has long been an obstacle to achieving high performance in a processor or central processing unit of an information handling system. Branch instructions alter the instruction streams inherent, straight-line flow of control, and typically cause the CPU to stall while those instructions along the branch path are fetched from a cache or other memory unit.

As processors increase the number of instructions that they are able to process per cycle, it becomes desirable to process two branch instructions in a single cycle. Most high performance processors of today implement a branch history table (BHT) to improve branch prediction accuracy. If two branch instructions are processed in a single cycle, two updates to the branch prediction data stored in the BHT may occur at the same time. In order to write both updates to the BHT at the same time, a two write-ported BHT is needed. However, a two write-ported BHT greatly increases the size and complexity of the BHT.

Thus, what is needed is a method for updating a branch history table in a processor which resolves multiple branches in a single cycle wherein only one write port of the BHT is used for updating the BHT. In other words, an arbitration scheme is needed which selects only one of two data updates presented to the BHT at the same time.

SUMMARY OF THE INVENTION

It is object of the present invention to use a single write ported BHT for updating the BHT when multiple branches are resolved during the same time.

It is another object of the present invention to develop a scheme for determining which one of the multiple branch instructions has the highest priority for purposes of updating the BHT.

Accordingly, the present invention provides a method for updating a branch history table (BHT) in a processor comprising the steps of a) predicting, for a first and a second branch instruction whether the branch path of instructions is taken; b) resolving, for the first and second branch instructions, which path of instructions is taken according to the predictions from step a); and c) selecting data corresponding to one of the first or second branch instructions to be updated in the BHT in response to whether the predictions in step a) were correct.

The present invention also provides an apparatus for updating a BHT. The apparatus comprises a processor including a BHT for storing branch prediction data wherein the BHT includes a single write port for updating the BHT. The apparatus of the present invention further includes circuitry for predicting, for a first and a second branch instruction that control the order of subsequent instructions processed by the processor between a sequential path of instructions and a branch path of instructions, whether the branch path of instructions is taken. Branch resolution circuitry is included for resolving, according to the predictions by the circuitry for predicting and within the same cycle, which path of instructions is taken for the first and second branch instructions. The branch resolution circuitry further includes determining circuitry for determining whether the predictions for the first and second branch instructions were correct. The apparatus for the present invention further includes a BHT write port arbitration circuit for selecting data corresponding to one of the first or second branch instructions to be updated in the BHT via the write port in response to whether the predictions were correct.

The present invention provides the advantage of using a single write-ported BHT that achieves similar performance to a two write-ported BHT.

DETAILED DESCRIPTION OF A PREFERRED EMBODIMENT OF THE INVENTION

Figure 1:
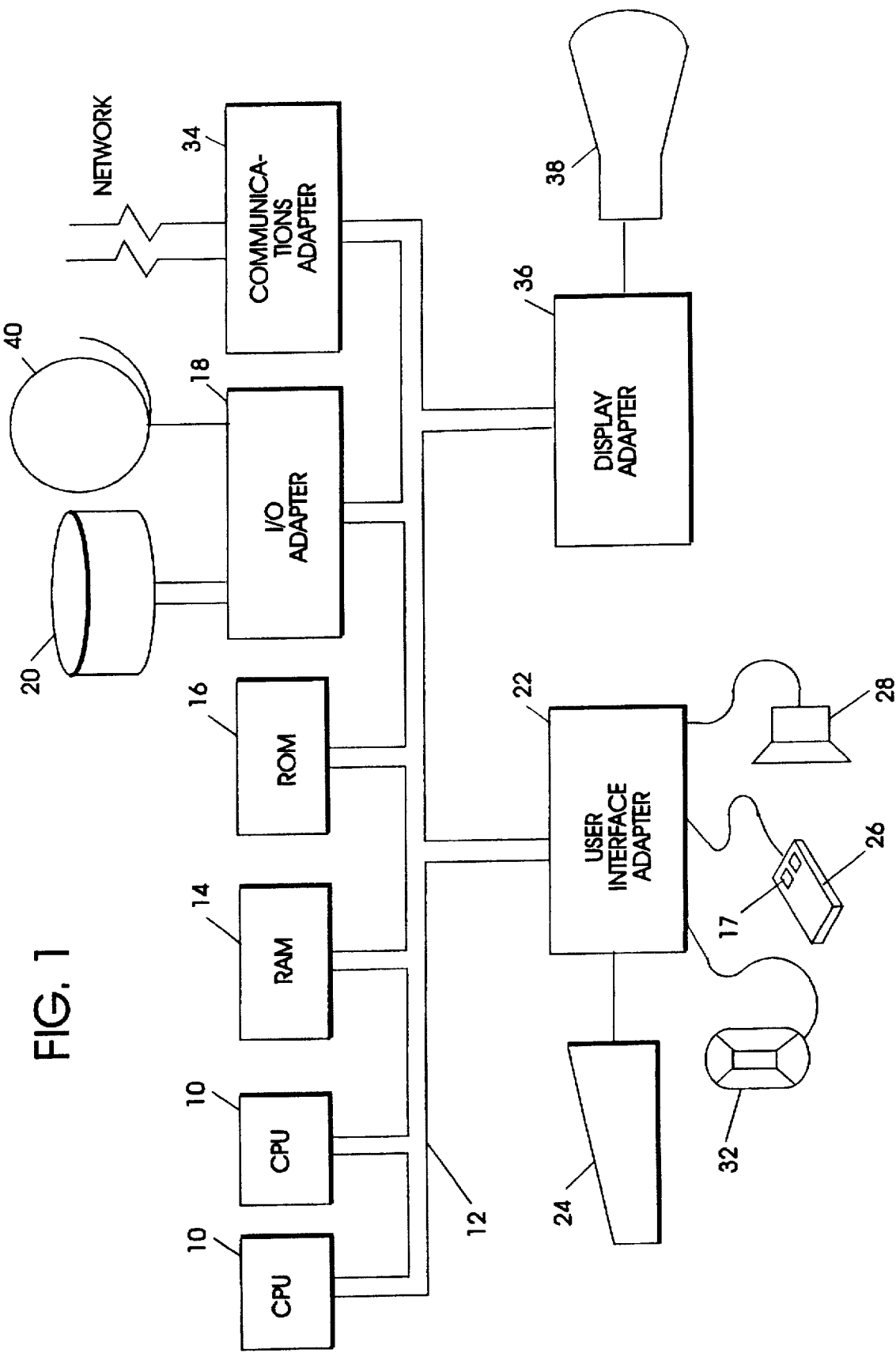
FIG. 1 is an information handling system embodying the present invention.

A representative hardware environment for practicing the present invention is depicted in FIG. 1, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 20 and tape drives 40, to bus 12, user interface adapter 22 for connecting keyboard 24, mouse 26 having a mouse button 17, speaker 28, microphone 32, and/or other user interface devices such as touch screen device (not shown) to bus 12, communication adapter 34 for connecting the information handling system to a data processing network, and display adapter 36 for connecting bus 12 to display device 38.

Unless otherwise specified, the word "data" means any information and includes data and instructions.

Figure 2:
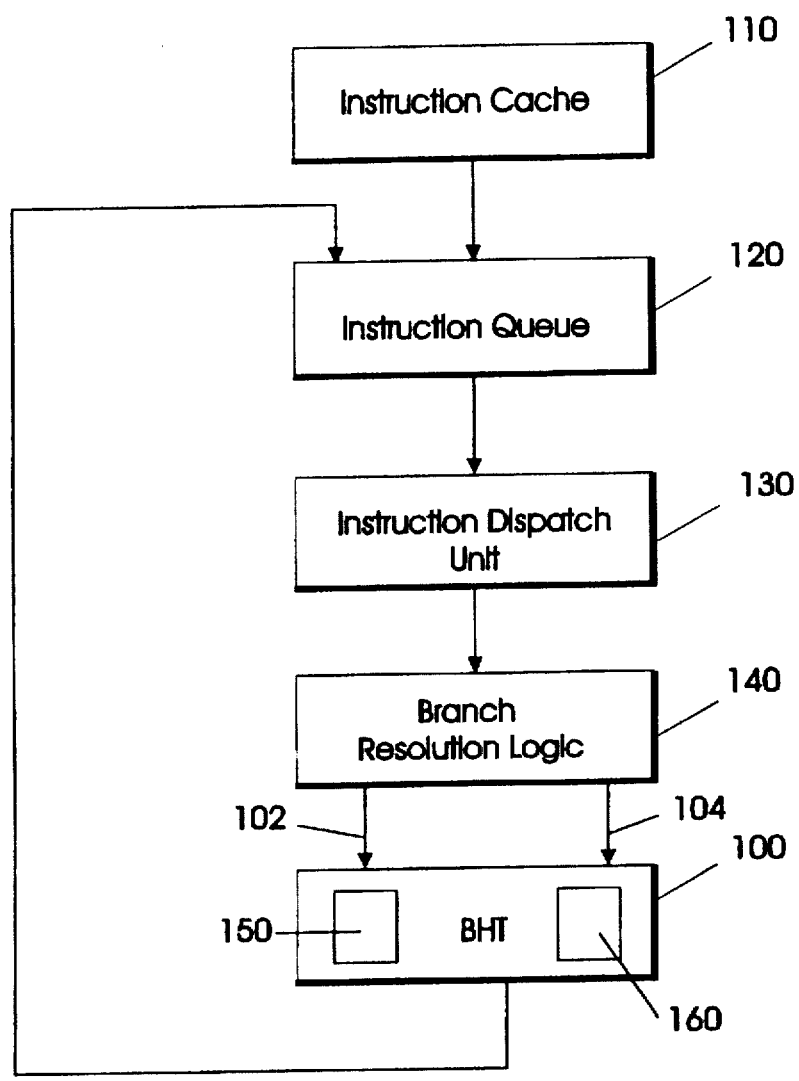
FIG. 2 is a block diagram illustrating a prior art approach for updating a branch history table in a information handling system.

FIG. 2 illustrates a prior art apparatus and method for updating branch prediction data stored in a branch history table (BHT) 100 having two write ports 102 and 104. The apparatus and method illustrated in FIG. 2 is typically implemented in a processor or CPU operating at a predetermined number of cycles per second and includes an instruction cache 110 for storing instructions to be fetched. The instructions to be fetched are located at predetermined addresses. At least one instruction queue 120 is operably coupled to instruction cache 110 for storing a set of instructions fetched from instruction cache 110. An instruction dispatch unit 130 is operably coupled to instruction queue 120 for controlling dispatch of the instructions contained within instruction queue 120. Branch resolution logic 140 is operably coupled to instruction dispatch unit 130 and to BHT 100. Branch resolution logic 140 performs the function of resolving branch instructions, i.e., for a branch instruction that controls the order of subsequent instructions processed by the processor between a first sequential patch of instructions and a second branch path of instructions, selecting which path to take. A branch instruction is said to be "taken" when the second branch path of instructions is selected thereby altering, or jumping from the first sequential or straight-line path of instructions. If a branch instruction is "not taken" then the instruction stream continues along the first sequential path of instructions. If a branch instruction cannot be resolved due to an unfulfilled condition then the branch instruction must first be predicted or guessed as being taken or not taken and resolved accordingly. Branch resolution logic 140 utilizes the branch prediction data stored in BHT 100 for this purpose, i.e., to predict unresolved branches and resolve the branches according to the predictions. For example, an unresolved branch instruction is resolved as taken if predicted to be taken. Branch resolution logic 140 provides a status update based upon the accuracy of predictions for the branch instructions to BHT 100 via write ports 102 and 104. In other words, branch resolution logic 140 tracks the condition which determines whether a conditional branch instruction is taken and determines whether the prediction for the branch instruction was correct. Thus, branch resolution logic 140 writes update data to BHT 100 for two resolving branch instructions within the same time or, in other words, in parallel. Preferably, branch resolution logic 140 processes the two branch instructions within the same clock cycle. BHT 100 is operably coupled to instruction queue 120 for providing instruction queue 120 with BHT data entries at the same time that the set of instructions fetched from instruction cache 110 are stored in instruction queue 120. As is well known in the art, BHT 100 includes one or more saturation up-down counters 150, 160 wherein each branch instruction is assigned to one of the saturation up-down counters. Preferably, up-down counters 150, 160 are two bit saturation up-down counters. Each BHT data entry is the value or state of up-down counters 150, 160.

Figure 3:
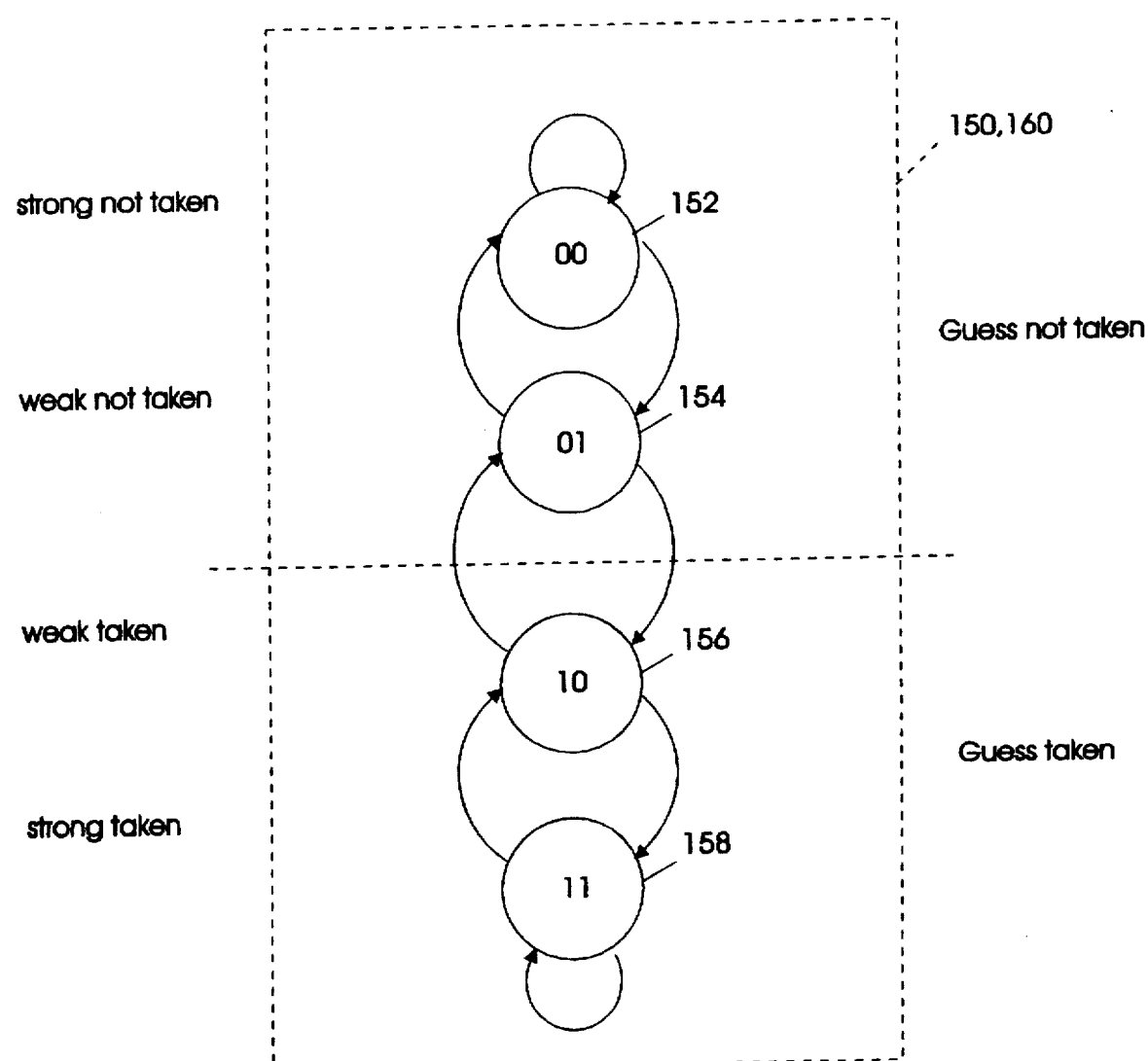
FIG. 3 is a state diagram illustrating the operation of a two bit saturation up-down counter utilized in a branch history table according to the present invention.

FIG. 3 illustrates a state diagram for two bit up-down counters 150, 160. Two bit up-down counters 150, 160 include four states. A branch instruction which currently cannot be resolved is predicted either not taken or taken depending upon which state two bit up-down counters 150, 160 are in. The four states of up-down counters 150, 160 include a "00" or "strong not taken state" 152, a "01" or "weak not taken state" 154, a "10" or "weak taken state" 156, and an "11" or "strong taken state" 158. If two bit up-down counters 150, 160 are in states 152 or 154, then a branch instruction is "guessed not taken." If two bit up-down counters 150, 160 are in states 156 or 158, a branch instruction is "guessed taken." Two bit up-down counters 150,160 change states based upon the status updates received from branch resolution logic 140. For example, if two bit up-down counter 150 is currently in state 156 and a status update which indicates that the branch instruction corresponding to counter 150 correctly predicted the branch as taken, then the state changes from state 156 to state 158. If, on the other hand, the branch instruction was not taken, a misprediction has occurred and the state changes from state 156 to state 154 wherein the branch instruction will be predicted or guessed not taken. Two bit up-down counters 150, 160 are said to be saturated when in states 152 or 158 due to back-to-back correct predictions.

Figure 4:
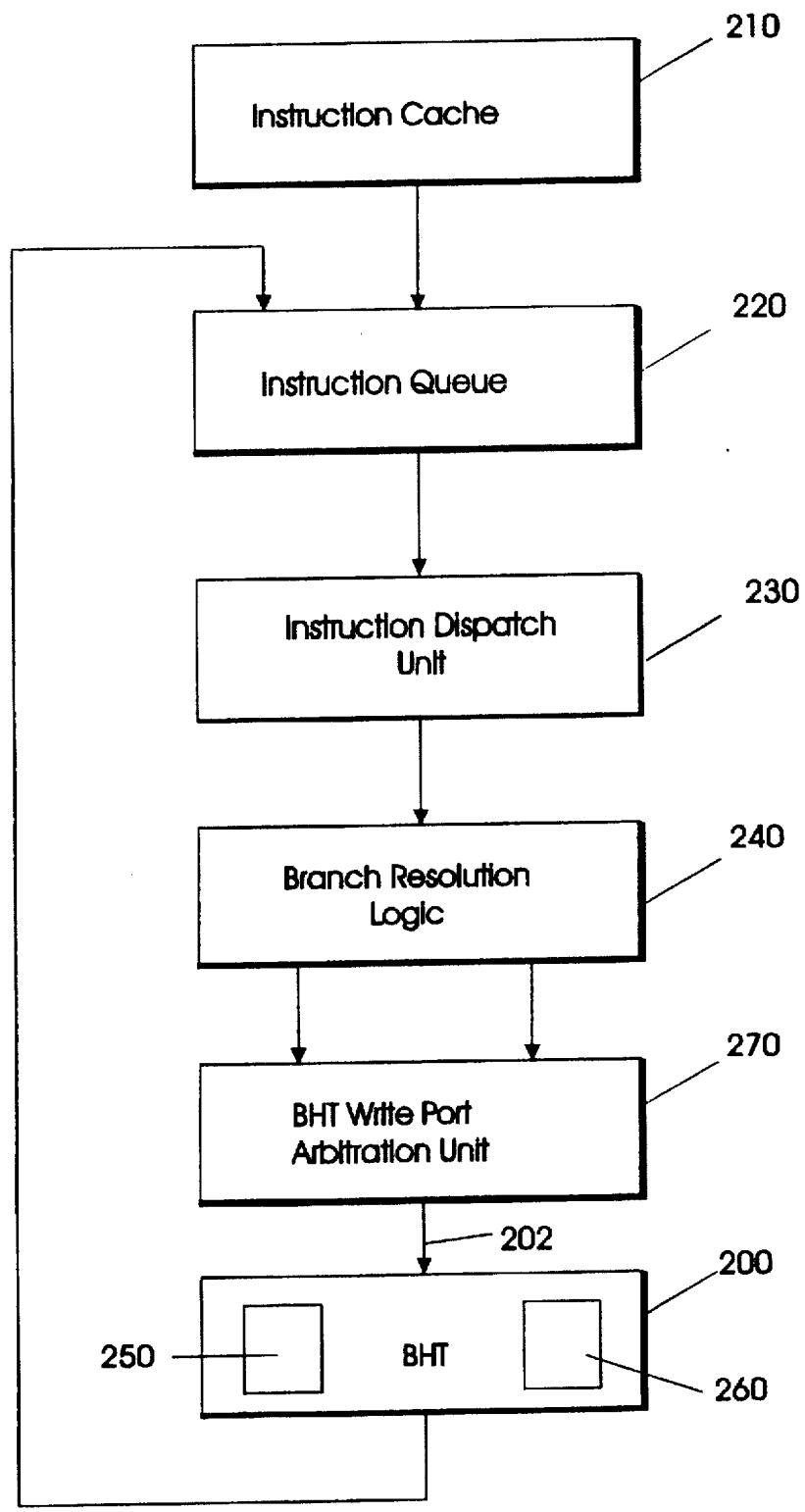
FIG. 4 is a block diagram illustrating an apparatus and method for updating a branch history table according to the present invention.

Referring now to FIG. 4, the apparatus and method of the present invention are illustrated wherein reference numerals which are similar to the reference numerals in FIG. 3 indicate like or similar parts. FIG. 4 is identical to FIG. 3 except for the addition of block 270 which indicates a BHT write port arbitration unit according to the present invention. BHT write port arbitration unit 270 selects data corresponding to one of the two branch instructions being resolved for updating BHT 200. In this manner, BHT 200 includes a single write port 202 instead of the dual write port 102, 104 illustrated in FIG. 2.

Figure 5:
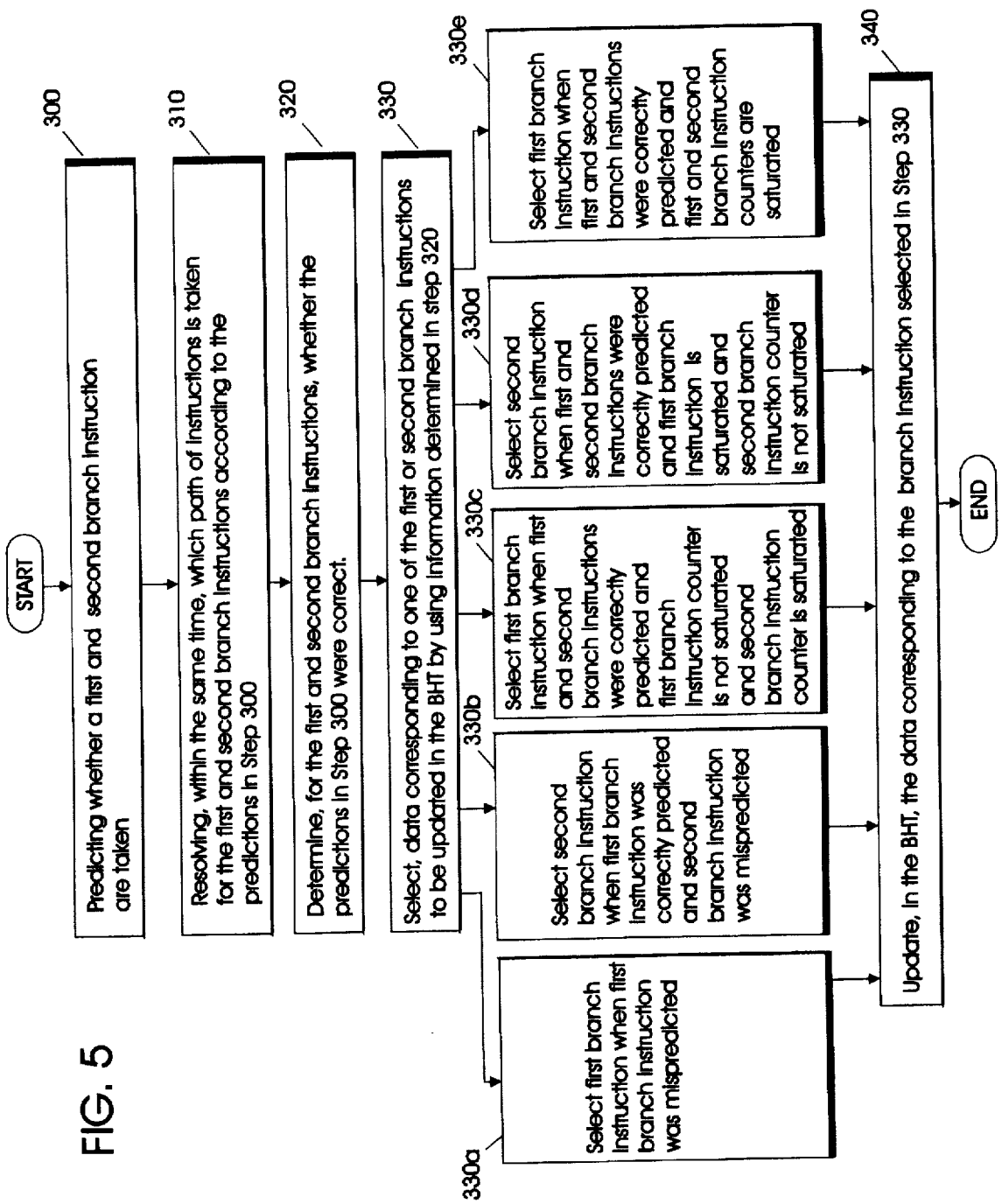
FIG. 5 is a flow chart illustrating a method according to the present invention.

FIG. 5 illustrates a method for updating a BHT in a processor operating a predetermined number of cycles per second. According to the present invention, the method includes the step of predicting, for a first and a second branch instruction that control the order of all subsequent instructions processed by the processor between a first sequential path of instructions and a second branch path of instructions, whether the second branch path of instructions is taken in step 300. Step 310 includes resolving, within the same time, which path of instructions is taken for the first and second branch instructions according to the predictions from step 300. Step 320 includes determining, for the first and second branch instructions, whether the predictions in step 300 were correct. Step 330 includes selecting data corresponding to one of the first or second branch instructions to be updated in the BHT based upon the information determined in step 320.

In step 340, the method of the present invention further includes updating, in the BHT, the data corresponding to the branch instruction selected in step 330. Selecting step 330 includes the step of selecting the data corresponding to the first branch instruction to be updated in the BHT when the prediction for the first branch instruction was mispredicted (step 330a) and selecting the data corresponding to the second branch instruction to be updated in the BHT when the prediction for the first branch instruction was correctly predicted and the prediction for the second branch instruction was mispredicted (step 330b). Selecting step 330 further includes selecting the data corresponding to the first branch instruction to be updated in the BHT when both of the predictions for the first and second branch instructions were correctly predicted and the saturation up-down counter corresponding to the first branch instruction is not saturated and the saturation up-down counter corresponding to the second branch instruction is saturated (step 330c); selecting the data corresponding to the second branch instruction to be updated in the BHT when both predictions for the first and second branch instructions were correctly predicted and the saturation up-down counter corresponding to the second branch instruction is not saturated in the saturation up-down counter corresponding to the first branch instruction is saturated (step 330d); and selecting the data corresponding to the first branch instruction to be updated in the BHT when both of the predictions for the first and second branch instructions were correctly predicted and when the saturation up-down counter corresponding with the first branch instruction is saturated and when the saturation up-down counter corresponding to the second branch instruction is saturated (step 330e).

The present invention also includes an apparatus for updating a BHT 200. The apparatus comprises a processor, such as processor 10, operating a predetermined number of cycles per second. The processor includes BHT 200 having a single write port 202 for updating BHT 200. The apparatus of the present invention includes a branch resolution logic 240 for predicting and resolving, based on the predictions, a first branch instruction and a second branch instruction within the same time or cycle in which the first branch instruction is resolved. The branch resolution logic 240 includes logic for determining whether the first and second branch instructions were predicted correctly.

The apparatus of the present invention also includes a BHT write port arbitration unit 270 for selecting data corresponding to one of the first or second branch instructions to be updated in BHT 200 via write port 202 by utilizing the prediction accuracy information from branch resolution logic 240. BHT arbitration unit 270 selects the data corresponding to the first branch instruction to be updated in BHT 200 when the prediction for the first branch instruction was mispredicted, selects the data corresponding to the second branch instruction to be updated in BHT 200 when the prediction for the first branch instruction was correctly predicted and the prediction for the second branch instruction was mispredicted, selects the data corresponding to the first branch instruction to be updated in BHT 200 when both predictions for the first and second branch instructions were correctly predicted and saturation up-down counter 250 corresponding to the first branch instruction is not saturated and a saturation up-down counter 260 corresponding to the second branch instruction is saturated, selects the data corresponding to the second branch instruction to be updated in BHT 200 when both predictions for the first and the second branch instructions were correctly predicted and saturation up-down counter 260 is not saturated and saturation up-down counter 250 is saturated, and selects the data corresponding to the first branch instruction to be updated in BHT 200 when both predictions for the first and second branch instructions were correctly predicted and saturation up-down counter 250 is saturated and when saturation up-down counter 260 is saturated.

Although the present invention and its advantages have been described in detail, it should be understood that various changes, substitutions and alterations can be made herein without departing from the spirit or scope of the invention as defined in the appended claims.

What is claimed is:

1. A method for updating a branch history table (BHT) with data in a processor, said method comprising the steps of:

a) predicting, for a first and a second branch instruction, whether the branch path of instructions is taken;

b) resolving, for the first and second branch instructions, which path of instructions is taken according to the predictions from step a);

c) selecting data corresponding to one of the first or second branch instructions to be updated in the BHT in response to whether the predictions in step a) were correct.

2. The method as recited in claim 1, further including the step of updating the data selected in step c).

3. The method as recited in claim 1, wherein the step of selecting includes the step of selecting the data corresponding to the first branch instruction to be updated in the BHT when the prediction for the first branch instruction was mispredicted.

4. The method as recited in claim 1, wherein the step of selecting includes the step of selecting the data corresponding to the second branch instruction to be updated in the BHT when the prediction for the first branch instruction was correctly predicted and the prediction for the second branch instruction was mispredicted.

5. The method as recited in claim 1, wherein the step of selecting includes the step of providing saturation up-down counters for the BHT when both the predictions for the first and second branch instructions were correctly predicted.

6. The method as recited in claim 5, further including the step of selecting the data corresponding to the first branch instruction to be updated in the BHT if a saturation up-down counter corresponding to the first branch instruction is not saturated and a saturation up-down counter corresponding to the second branch instruction is saturated.

7. The method as recited in claim 5, further including the step of selecting the data corresponding to the second branch instruction to be updated in the BHT if a saturation up-down counter corresponding to the second branch instruction is not saturated and a saturation up-down counter corresponding to the first branch instruction is saturated.

8. The method as recited in claim 5, further including the step of selecting the data corresponding to the first branch instruction to be updated in the BHT when a saturation up-down counter corresponding to the first branch instruction is saturated and when a saturation up-down counter corresponding to the second branch instruction is saturated.

9. A method for updating a branch history table (BHT) with branch prediction data and including saturation up-down counters in a processor, said method comprising the steps of:

a) predicting, for a first and a second branch instruction, whether the branch path of instructions is taken;

b) resolving, for the first and second branch instructions, which path of instructions is taken in response to the predictions from step a);

c) determining, for the first and second branch instructions, whether the predictions in step a) were correct; and d) selecting the branch prediction data corresponding to one of the first or second branch instructions to be updated in the BHT by performing the following steps:

1) selecting the data corresponding to the first branch instruction to be updated in the BHT when the prediction for the first branch instruction was mispredicted;

2) selecting the data corresponding to the second branch instruction to be updated in the BHT when the prediction for the first branch instruction was correctly predicted and the prediction for the second branch instruction was mispredicted;

3) when both the predictions for the first and the second branch instructions were correctly predicted, selecting according to the following steps:

i) selecting the data corresponding to the first branch instruction as the branch instruction to be updated in the BHT if a saturation up-down counter corresponding to the first branch instruction is not saturated and a saturation up-down counter corresponding to a second branch instruction is saturated;

ii) selecting the data corresponding to the second branch instruction to be updated in the BHT if a saturation up-down counter corresponding to the second branch instruction is not saturated and a saturation up-down counter corresponding to the first branch instruction is saturated; and iii) selecting the data corresponding to the first branch instruction to be updated in the BHT when a saturation up-down counter corresponding to the first branch instruction is saturated and when a saturation up-down counter corresponding to the second branch instruction is saturated; and e) updating the branch prediction data stored in the BHT for the branch instruction selected in step d).

10. An apparatus for updating a branch history table (BHT), said apparatus comprising:
   a) a processor including a BHT for storing data, said BHT having in a single write port for updating the data in said BHT;
   b) means for predicting, for a first and a second branch instruction that control the order of subsequent instructions processed by said processor between a sequential path of instructions and a branch path of instructions, whether said branch path of instructions is taken;
   c) branch resolution means for resolving, according to the predictions by said means for predicting and within the same cycle, which path of instructions is taken for said first and second branch instructions;
   d) said branch resolution means including determining means for determining whether the predictions, for said first and second branch instructions by said means for predicting, were correct; and
   e) BHT write port arbitration means for selecting data corresponding to one of said first or second branch instructions to be updated in said BHT via said write port in response to whether the predictions were correct.

11. The apparatus as recited in claim 10, further including updating means in said processor for updating the data corresponding to one of said branch instructions in said BHT as selected by said BHT write port arbitration means.

12. The apparatus as recited in claim 10, wherein said BHT write port arbitration means further includes means for selecting data corresponding to said first branch instruction to be updated in said BHT when the prediction for said first branch instruction was mispredicted.

13. The apparatus as recited in claim 10, wherein said BHT write port arbitration means further includes means for selecting data corresponding to said second branch instruction to be updated in said BHT when the prediction for said first branch instruction was correctly predicted and the prediction for said second branch instruction was mispredicted.

14. The apparatus as recited in claim 1, wherein said BHT write port arbitration means further includes means for selecting data corresponding to said first branch instruction to be updated in said BHT when both the predictions for said first and second branch instructions were correctly predicted and if a saturation up-down counter corresponding to said first branch instruction is not saturated and a saturation up-down counter corresponding to said second branch instruction is saturated.

15. The apparatus as recited in claim 1, wherein said BHT write port arbitration means further includes means for selecting data corresponding to said second branch instruction to be updated in said BHT when both the predictions for said first and second branch instructions were correctly predicted and if a saturation up-down counter corresponding to said second branch instruction is not saturated and a saturation up-down counter corresponding to said first branch instruction is saturated.

16. The apparatus as recited in claim 1, wherein said BHT write port arbitration means further includes means for selecting data corresponding to said first branch instruction to be updated in said BHT when the predictions for both said first and second branch instructions were correctly predicted and when a saturation up-down counter corresponding to said first branch instruction is saturated and when a saturation up-down counter corresponding to said second branch instruction is saturated.

* * * * *